Aug. 19, 1924.
E. P. DU PONT
1,505,134
BRAKE MECHANISM FOR AUTOMOBILES
Filed May 17, 1922
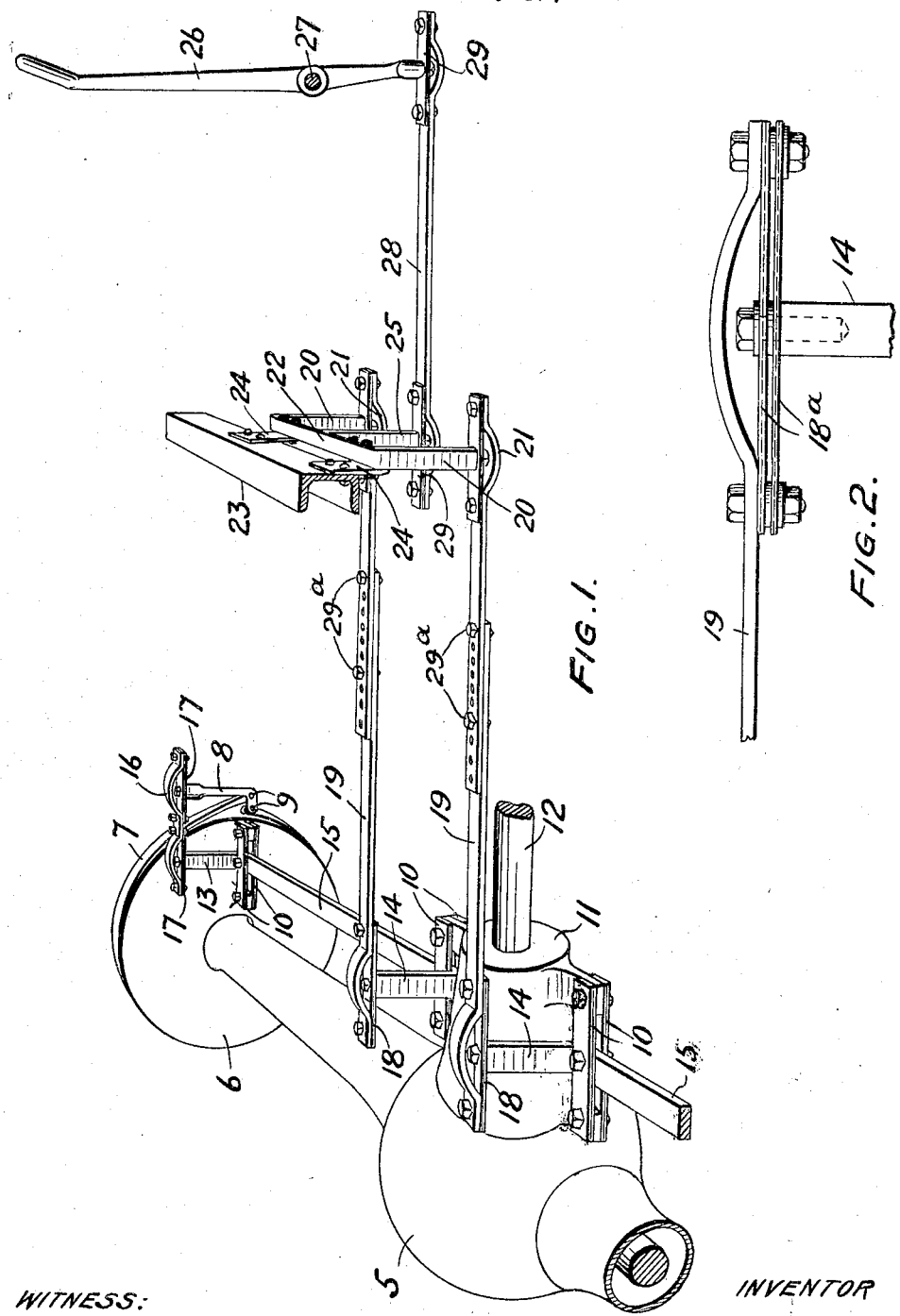
WITNESS:
INVENTOR
Eleuthere Paul du Pont
BY
ATTORNEY.

Patented Aug. 19, 1924.

1,505,134

UNITED STATES PATENT OFFICE.

ELEUTHERE PAUL du PONT, OF MONTCHANIN, DELAWARE.

BRAKE MECHANISM FOR AUTOMOBILES.

Application filed May 17, 1922. Serial No. 561,594.

*To all whom it may concern:*

Be it known that I, ELEUTHERE PAUL DU PONT, a citizen of the United States, residing at Montchanin, county of New Castle, and State of Delaware, have invented a new and useful Improvement in Brake Mechanism for Automobiles, of which the following is a full, clear, and exact description, reference being had to the accompanying drawings, which form a part of this specification.

In all brake actuating mechanisms known to me, the various rods and levers between the brake applying levers and the brake bands or shoes are connected to each other by fulcrum pins about the axes of which the various elements turn when the brakes are applied or released. The engaging or bearing surfaces of the various elements surrounding the axes of rotation require frequent lubrication, as such surfaces are subjected to considerable wear, which wear will cause objectionable rattle after a short period of use.

The object of my invention is to provide mechanism of this character which will not require lubrication and which will not be subjected to such wear as to cause rattle.

This is accomplished by fixedly connecting a flexible member to the members to be moved relative to each other, which is arranged to permit one member to move longitudinally while the other moves about a fulcrum, and which flexible members are arranged to substantially resist movements of the connected elements in undesired directions.

The precise nature of my invention will be best understood by reference to the accompanying drawings, which will now be described, it being premised, however, that various changes may be made in the details of construction without departing from the spirit and scope of my invention as defined in the appended claims.

Fig. 1 is a perspective view, partially in section, of a portion of an automobile with one form of my invention applied thereto, and in which I have only shown the brake band on one side of the automobile.

Fig. 2 is a detail view showing one form of connection between the outer end of one of the levers and a connecting rod.

In the drawings, 5 designates the axle housing and 6 the flange on one end thereof enclosing the one side of the brake drum on one of the rear wheels.

7 is the brake band which surrounds the drum on the said rear wheel at this end of the axle, and which band is tightened about the drum when it is desired to brake the automobile.

The ends of the brake band 7 are connected at separated points to a band actuating lever 8 and which is adapted to rock about either or both of the axes of the pins 9 connecting the band to the lever 8.

Supported on each side of the longitudinal center of the automobile by flexible connectors 10 connected at their ends to lugs on the flange 6 and a bearing 11 for the driving shaft 12 are yokes or two armed levers having lever arms 13 and 14 at the ends of the connecting members 15. The members 10 are preferably formed of strips of rubber belting having sufficient flexibility to permit the rocking of the yokes, and at the same time sufficient tensile strength to support the load suspended thereby without substantial sag or endwise movement of the yokes.

In this form of construction the yokes are clamped between the members 10 by through-bolts, while the ends of the members are secured to the upper and lower faces of the supporting lugs by similar bolts.

The upper ends of levers 8 and 13 at both sides of the automobile are connected to a rod 16 through the medium of a flexible member or members 17. The rod 16 is provided with indented or recessed portions above the ends of levers 8 and 13 to provide play for the ends of said levers. The flexible members 17 are similar to members 10 and are fixedly bolted to the ends of levers 8 and 13 as well as to the rod 16 at opposite sides of the levers.

18 are flexible members similar to members 17 connected to the ends of levers 14 and the rear ends of brake rods 19, there being one such rod on each side of the longitudinal center of the automobile. The other or front end of each of the rods 19 is similarly connected to a lever 20 through the medium of a similar flexible member 21. The lever arms 20 together with a connecting member 22 form a yoke which is suspended from a cross-bar 23 of the chassis of the automobile by means of flexible members 24, which are bolted to the cross-bar 23 and to the connecting member 22.

The last mentioned yoke is suspended centrally with relation to the longitudinal center of the automobile and is provided with an intermediate lever arm 25 rigidly connected to member 22.

26 is a hand brake lever pivoted at 27 to the frame or any fixed part of the automobile, and 28 is a rod connected at its ends to levers 25 and 26 by flexible members 29 in a manner similar to that by which the members 17, 18 and 21 are connected.

The various flexible members must have sufficient flexibility to permit the proper swinging movement when applying or releasing the brakes, as well sufficient tensile strength to support the required load without bowing sufficiently to permit lateral movement of the suspended parts. When flexible suspension members, such as 24, are used, they should be of sufficient width to prevent transverse movement.

In some cases it may be desirable to use two or more members such as 18$^a$ for connecting the end of a lever to a rod as shown in Fig. 2. This form of connection provides greater flexibility in proportion to the tensile strength of the flexible connecting members and are connected to each other by through-bolts and washers interposed between the members 18$^a$.

The rods 19 are formed in two pieces and are each provided with spaced holes for the reception of securing bolts 29$^a$, the arrangement being such that the rods may be lengthened or shortened, if desired. Such adjustment may also be provided for rod 28, if desired.

The advantages of my invention result from the provision of means for flexibly supporting and connecting to each various members of the brake mechanism for vehicles without bearing surfaces on the different members movable relative to each other, whereby I am enabled to overcome the necessity of lubricating the brake mechanism as well as to prevent rattle caused by worn bearings.

Having now fully described my invention, what I claim and desire to protect by Letters Patent is:

1. In brake mechanism for vehicles, in combination, a brake device, a brake actuating device including a longitudinally movable rod and a rocking lever, and a flexible member connected adjacent its ends to the rod and connected to the lever between its points of connection to the rod, whereby the rod and lever may be moved together.

2. Brake mechanism for vehicles comprising a braking device, a brake actuating lever, means adapted to afford a connection between said brake and lever, and flexible means adapted to support and connect said first mentioned means to said brake and lever.

3. Brake mechanism for vehicles comprising a braking member, a brake applying lever, a plurality of levers between the brake applying lever and the braking member, flexible supporting members for suspendingly supporting said levers, and connecting rods connected to said levers by flexible members connected to one of said elements between its ends and connected to the other element on both sides of the last mentioned connection so as to suspend the one element from the other and to cause the levers and rods to move in unison in either direction without substantial lost motion when the brake applying lever is actuated.

4. Brake mechanism for vehicles comprising a braking member, a braking member shifting device, actuating rods and levers interposed between the braking member and the braking member shifting device, and flexible supporting and connecting members for the actuating rods and levers, each flexible member being fixedly connected to two elements to permit the levers to fulcrum and to move the rods longitudinally in unison with the outer ends of the levers by flexing the flexible members.

5. Brake mechanism for automobiles comprising a brake band on each side arranged to be contracted about brake drums on the rear wheels thereof, a brake band contracting lever for each band, a two armed yoke on each side of the automobile, the outer arm of each yoke being connected to the contracting lever at that side by a connecting rod, said rods having flexible members fixedly connected thereto at two points, said flexible members also being fixedly connected to the arms and levers between their points of connection to the rods, flexible supporting members for the two armed yokes fixedly connected thereto intermediate their ends, said supporting members being fixedly connected at their ends to a fixed portion of the automobile, a three armed yoke suspended by a flexible member fixedly connected thereto and to a fixed portion of the automobile, each of the outer arms of the three armed yoke being connected to an inner arm of one of the two armed yokes by a connecting rod by means of flexible connecting members, said flexible members being connected at their ends to the connecting rods and intermediate their ends to an arm of one of the yokes, a brake actuating lever, and a rod connected to the brake actuating lever and the intermediate arm of the three armed yoke by means of flexible members fixedly connected to the rod, arm and lever.

In testimony of which invention, I have hereunto set my hand, at Wilmington, Del., on this 15th day of May, 1922.

ELEUTHERE PAUL DU PONT.